US009120300B2

(12) United States Patent
Moehringer et al.

(10) Patent No.: US 9,120,300 B2
(45) Date of Patent: Sep. 1, 2015

(54) MACHINE FOR INKJET PRINTING ON THREE-DIMENSIONAL OBJECTS

(71) Applicant: HEIDELBERGER DRUCKMASCHINEN AG, Heidelberg (DE)

(72) Inventors: Markus Moehringer, Weinheim (DE); Henning Niggemann, Dossenheim (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 14/496,103

(22) Filed: Sep. 25, 2014

(65) Prior Publication Data

US 2015/0085046 A1 Mar. 26, 2015

(30) Foreign Application Priority Data

Sep. 26, 2013 (DE) .......................... 10 2013 016 006

(51) Int. Cl.
| | |
|---|---|
| *B41J 2/01* | (2006.01) |
| *B41J 3/00* | (2006.01) |
| *B41F 17/30* | (2006.01) |
| *B41J 3/407* | (2006.01) |
| *B41J 2/14* | (2006.01) |
| *B41J 3/28* | (2006.01) |
| *B29C 67/00* | (2006.01) |

(52) U.S. Cl.
CPC . *B41F 17/30* (2013.01); *B41J 2/14* (2013.01); *B41J 3/4073* (2013.01); *B29C 67/0059* (2013.01); *B41J 3/283* (2013.01); *B41J 3/286* (2013.01)

(58) Field of Classification Search
CPC ........................................................ B41J 3/286
USPC ............................................................. 347/2
See application file for complete search history.

(56) References Cited

U.S. PATENT DOCUMENTS

| | | | |
|---|---|---|---|
| 4,829,894 | A | 5/1989 | Gardner |
| 6,538,767 | B1 | 3/2003 | Over et al. |
| 6,923,115 | B1 | 8/2005 | Litscher et al. |
| 2002/0097280 | A1 | 7/2002 | Loper et al. |
| 2002/0134257 | A1 | 9/2002 | Stephenson |

FOREIGN PATENT DOCUMENTS

| | | |
|---|---|---|
| JP | H08207265 A | 8/1996 |
| JP | 2007008110 A * | 1/2007 |

OTHER PUBLICATIONS

Machine Translation of JP2007008110A, Inkjet Printer for Sphere Media Print and Printing Method Using the Same, Jan. 18, 2007, Paragraphs 0020-0021.*

* cited by examiner

*Primary Examiner* — Lisa M Solomon
(74) *Attorney, Agent, or Firm* — Laurence A. Greenberg; Werner H. Stemer; Ralph E. Locher

(57) ABSTRACT

A machine for inkjet printing three-dimensional objects, for example gas-filled balls, includes an apparatus having an inkjet print head for inkjet printing an object, an apparatus having at least one sucker for holding the object and an apparatus having a first drive and a second drive for rotating the object about two rotational axes which are different from one another.

9 Claims, 3 Drawing Sheets

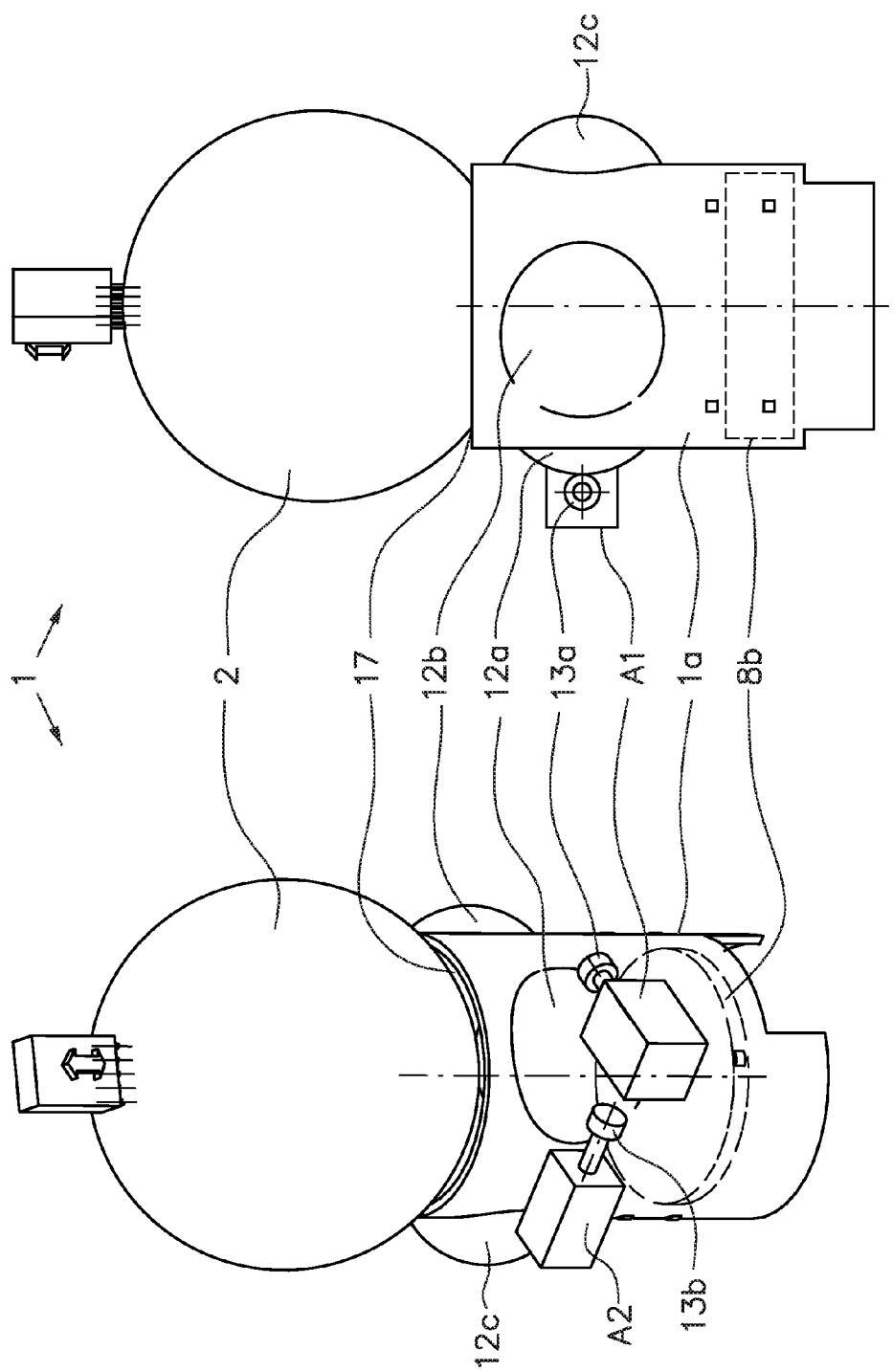

MACHINE FOR INKJET PRINTING ON THREE-DIMENSIONAL OBJECTS

CROSS-REFERENCE TO RELATED APPLICATION

This application claims the priority, under 35 U.S.C. §119, of German Patent Application DE 10 2013 016 006.5, filed Sep. 26, 2013; the prior application is herewith incorporated by reference in its entirety.

BACKGROUND OF THE INVENTION

Field of the Invention

The present invention relates to a machine for inkjet printing of three-dimensional objects. The machine includes an apparatus having an inkjet print head for inkjet printing an object, an apparatus for holding the object and an apparatus having a first drive and a second drive for rotating the object about two rotational axes which are different from one another.

The invention is in the technical field of the production of printed images on curved surfaces of objects, such as surfaces of balls or other spherical products.

The known prior art in that technical field includes the following:

U.S. Pat. No. 6,923,115 B1 discloses a device for printing balls. The balls are stored in a turret and are guided by a mechanical gripper to an inkjet print head and are rotated about two axes during the printing. The mechanical gripper grips the balls at two points which lie opposite one another by way of two clamping jaws and clamps the ball. One of the two clamping jaws is driven. The two clamping jaws are received on a frame which is likewise driven.

Japanese Patent Application JP 2007-8110 A also discloses a device for printing balls by inkjet. A ball is held fixedly during the printing by a gripper mechanism which is configured as a clamping apparatus. The device additionally has three drives which rotate the ball about two axes and displace it in one direction.

U.S. Patent Application Publication No. 2002/0134257 A1 discloses a further device for printing balls by inkjet. A ball is clamped between two holding pins and can be rotated about two axes which lie perpendicularly on one another.

Japanese Patent Application JP 08-207265 A discloses a machine for printing cylinders by inkjet. In that case, the cylinder is mounted rotatably on two rotatable supporting cylinders and is printed by a print head which can be moved parallel to the cylinder axis.

The use of the technical apparatuses described in the stated prior art can entail the following disadvantages: The objects have to be held securely during the printing. To that end, the prior art provides various mechanical holding, clamping or bracing mechanisms. They are disadvantageous, however, if a large number of objects are to be printed in a short time because, to that end, the objects have to be received and released again rapidly by the printing press. In addition, the surface of the objects is not to be damaged. A mechanical apparatus involves the risk of the surface being scratched. In addition, a holding apparatus must not cover too much surface area of the object if the objects are to be printed at a large number of locations or at any desired locations. Holding the object at two locations which lie opposite one another is therefore disadvantageous.

SUMMARY OF THE INVENTION

It is accordingly an object of the invention to provide a machine for inkjet printing on three-dimensional objects, which overcomes the hereinafore-mentioned disadvantages of and is improved in comparison with the heretofore-known machines of this general type and which makes it possible to print a three-dimensional object on its surface and to hold it securely and without damage in the process. In this case, the region, in which the object is held, is to represent as small a portion of the surface as possible. In addition, the object is to be rotatable simply and in any desired directions.

With the foregoing and other objects in view there is provided, in accordance with the invention, a machine for inkjet printing three-dimensional objects, comprising an apparatus including an inkjet print head for inkjet printing an object, an apparatus including at least one sucker for holding the object, and an apparatus including a first drive and a second drive for rotating the object about two rotational axes which are different from one another.

The machine according to the invention advantageously makes it possible to print a three-dimensional object, for example a ball, at any desired locations of its surface and to hold the object securely and without damage on the surface in the process. In this case, the region, in which the object is held, represents only a small proportion of the surface, that is to say a predominant part of the surface remains accessible for the printing. In this case, the object is rotatable simply and in any desired directions.

The ball can be substantially spherical, that is to say a handball, a volleyball or a soccer ball, or it can be a rotational ellipsoid and can have two acutely tapering ends, for example a rugby ball or a football. The ball has a gas-filled cover, for example made from leather, rubber or plastic. The cover can have seams.

The two drives are preferably electric rotational drives. The inkjet print head is preferably disposed in such a way that the ink droplets are ejected substantially downwardly.

In accordance with another preferred feature of the machine of the invention, the apparatus for rotating the object includes a rocker, the first drive drives the sucker and the second drive drives the rocker. The rocker can preferably have a substantially L-shaped configuration. The first drive is preferably disposed at one end of the rocker. The second drive is preferably disposed at an opposite end of the rocker.

In accordance with a further preferred feature of the machine of the invention, the rotational axes cross and lie perpendicularly on one another. The rotational axes lie preferably substantially parallel to the two arms of an L-shaped rocker. The crossing point preferably lies in the center of the object, for example in the center point of the ball. The first rotational axis preferably lies in a horizontal plane.

In accordance with an added preferred feature of the machine of the invention, the rocker is disposed on an apparatus for changing the distance of the object from the inkjet print head, which apparatus includes a third drive for changing the distance. This apparatus is preferably a rod which can be moved vertically with a linear drive. The second drive is preferably disposed on the apparatus, in particular on the rod. In the case of an up and down movement of the rod by way of the linear drive, the second drive for rotating the rocker and the rocker are also driven.

In accordance with an additional preferred feature of the machine of the invention, the apparatus for changing the distance of the object from the inkjet print head includes a fourth drive for rotating the apparatus for changing the distance of the object from the inkjet print head. The rotational movement allows the object to be moved parallel to a tool plane of the machine (preferably in a substantially horizontal plane) and to be brought into the respective active region of various units of the tool plane and to be positioned there. The units are, in particular, the inkjet print head and a unit for drying and/or curing the print by way of irradiation.

In accordance with yet another preferred feature of the machine of the invention, the apparatus for rotating the object includes three load-bearing spheres, the first drive driving a first load-bearing sphere and the second drive driving a second load-bearing sphere, the first and the second drives including in each case one friction wheel and the sucker including a fan. This embodiment affords the advantage that the object can be rotated freely in all directions and every location of the object surface can be printed. The two drives are actuated through a controller in such a way that a desired movement of the object is produced.

In accordance with yet a further preferred feature of the machine of the invention, the apparatus for inkjet printing includes a fifth drive for positioning the inkjet print head relative to the object and a sensor for measuring the distance between the inkjet print head and the object. The fifth drive can advance or return the print head in the direction of the center point of the object and, as a result, can change the printing distance, that is to say the ink flight distance. However, the fifth drive can also rotate and pivot the head, in order to always orient the head perpendicularly with respect to the forward printing direction and optionally to carry out an inclination adaptation.

In accordance with yet an added preferred feature of the machine of the invention, the object is a ball including a gas-filled cover and the machine includes an apparatus for filling the object with gas. This advantageously makes it possible to insert balls into the printing press which are not yet filled with gas and/or underinflated or overinflated balls. The filling with gas can then be performed inline and corrected if necessary.

In accordance with yet an additional preferred feature of the machine of the invention, the apparatus for filling the ball with gas includes a regulating device which fills the ball with gas or empties it until the distance of the ball from the inkjet print head corresponds to a predefined value. Since the circumference of the object changes with the pressure of the filling, a circumferential adaptation can be brought about by way of a change in the gas pressure in the interior of the object. As the circumference changes, the distance of the location to be printed of the object surface from the print head also changes. A drive for adjusting the print head can be dispensed with in this way. The adaptation of the pressure in the object can also take place continuously. To this end, a continuous distance measurement can take place. In the case of a deviating distance, the gas pressure is corrected correspondingly through the regulating device. In this way, the distance can be kept within a predefined value range (minimum and maximum pressure distance).

In accordance with a concomitant preferred feature of the machine of the invention, the apparatus for holding the object includes at least two or three suckers, and the suckers are disposed adjacent one another on the apparatus for holding the object. In this way, a plurality of small suckers (instead of one large sucker) can be used, and they can be disposed very close to one another, with the result that the predominant portion of the object surface can be printed in an unimpeded manner.

Other features which are considered as characteristic for the invention are set forth in the appended claims.

Although the invention is illustrated and described herein as embodied in a machine for inkjet printing on three-dimensional objects, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 3 includes a perspective and an elevational view of a third preferred exemplary embodiment of a machine according to the invention.

DETAILED DESCRIPTION OF THE INVENTION

Figure 1:
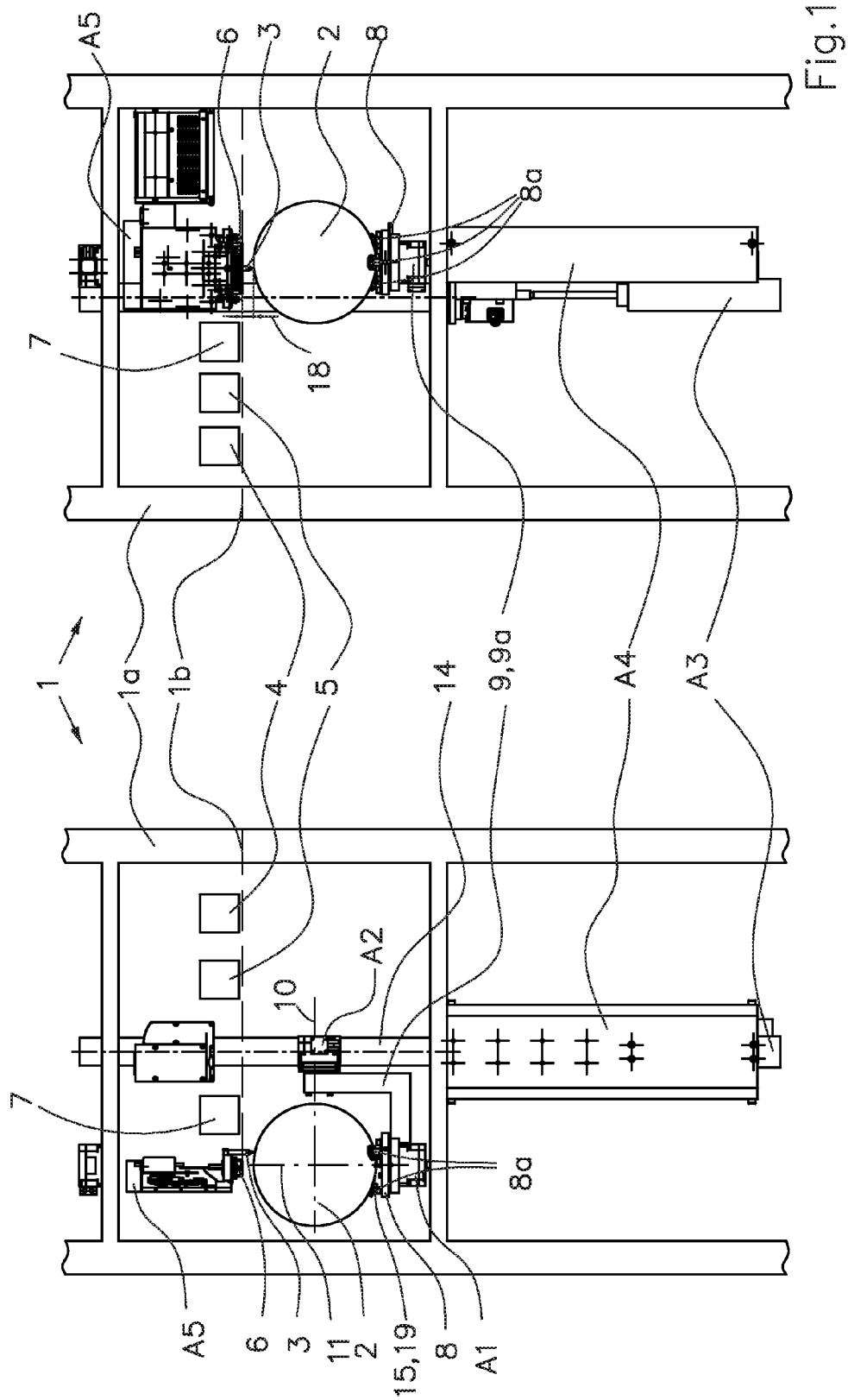
FIG. 1 includes two fragmentary, diagrammatic, elevational views of a first preferred exemplary embodiment of a machine according to the invention.

Referring now in detail to the figures of the drawings, in which elements that correspond to one another are each provided with the same designations, and first, particularly, to FIG. 1 thereof, there are seen elevational views of a preferred exemplary embodiment of a machine according to the invention in two views. The machine 1 includes a frame 1a having a tool plane 1b, in which various units for the overall process of printing an object 2 are provided. The object 2 is preferably a gas-filled ball 2, the circumference of which depends on the pressure of a gas.

The units of the tool plane 1b are:

A distance sensor 3. The distance sensor 3 measures a distance from the surface of the ball 2 to an inkjet print head 6. The measured result is used to bring about a distance change or correction if the measured actual distance deviates from a predefined setpoint distance. The measurement can be a running time measurement (ultrasound or light) or a triangulation (light) and known sensors can be used for this purpose.

A cleaning unit 4. The cleaning unit 4 cleans the surface of the ball 2 at least at the location to be printed, preferably by way of a liquid cleaner. The unit can be provided as a cloth washing unit, having a cloth which is impregnated with cleaner and is guided over the surface in an automated manner and in the process absorbs contaminants and dries the cleaned location.

An application unit 5 for a primer. It can be necessary to previously treat the location which is to be printed with a primer which improves the adhesion of the ink on the surface. The unit can be provided as a spray nozzle.

An inkjet print head 6. The print head transfers the ink droplets in accordance with the image data onto the ball surface. A plurality of print heads 6 (for example, CMYK) can also be provided for multiple color printing. The print head 6 can be disposed at a variable distance from the ball 2. In addition, it can be rotated and/or pivoted. Separate drives can be provided for these positional and angular adaptations. The print head can be assigned a cleaning unit for cleaning and covering the nozzles.

An irradiation unit 7. The irradiation unit 7 generates radiation which dries and/or cures the printed ink. It is preferably infrared or ultraviolet radiation, depending on the ink system which is used. A hot air stream can also be used.

The machine 1 has an apparatus 8 for holding the ball 2. In the embodiment which is shown, the apparatus 8 includes three suckers 8a which grip the ball reliably and without damage and hold it by way of a respective vacuum. Instead of the three suckers 8a, one circular sucker 8a or one annular sucker 8a can also be provided. It can be seen that the suckers 8a are disposed close to one another and adjacent one another on the apparatus 8. As a result, the region of the surface of the ball 2 which is covered by the suckers 8a is kept small and the printable region is only slightly restricted. In particular, it is not necessary to provide the suckers 8a on opposite sides of the ball. All of the suckers 8a are preferably situated in a surface section which corresponds approximately to ⅛ or less of the overall surface area.

The machine 1 has an apparatus 9 for rotating the ball 2. The apparatus 9 includes a rocker 9a, on which the apparatus 8 for holding the ball 2 is disposed. Moreover, a first drive A1, which is provided on the rocker 9, serves to rotate the holding apparatus 8 about a first rotational axis 11.

The apparatus 9 for rotating the ball 2 is disposed on an apparatus 14 for changing a distance 18 between the ball surface, that is to say the location to be printed, and the inkjet print head 6. The apparatus 9 is received rotatably on the apparatus 14, and a second drive A2 is provided for rotating the apparatus 9 about a second rotational axis 10. The apparatus 14 can be configured as a rod 9 which is moved linearly by a third drive A3.

The apparatus 14 can be rotated by a fourth drive A4. As a result of this rotation, the ball 2 is moved into the respective active region of the units of the tool plane 1b, that is to say, for example, after the printing by way of the inkjet print head 6 for drying and/or curing by way of the irradiation unit 7, or beforehand for cleaning by way of the unit 4 and for applying primer by way of the unit 5.

The apparatus 6 includes a fifth drive A5 for positioning the inkjet print head 6 relative to the object 2 and the sensor 3 for measuring the distance 18 between the inkjet print head 6 and the object 2.

A unit 15 for filling the ball with gas can be provided between the three suckers 8a. This unit can be configured, for example, as a tip with a channel. The valve of the ball is placed onto the tip and gas is filled under pressure into the ball through the channel. The unit 15 includes a regulating device 19 regulating filling of the ball 2 with gas or emptying of the ball until the distance 18 between the ball 2 and the inkjet print head 6 corresponds to a predefined value.

Figure 2:
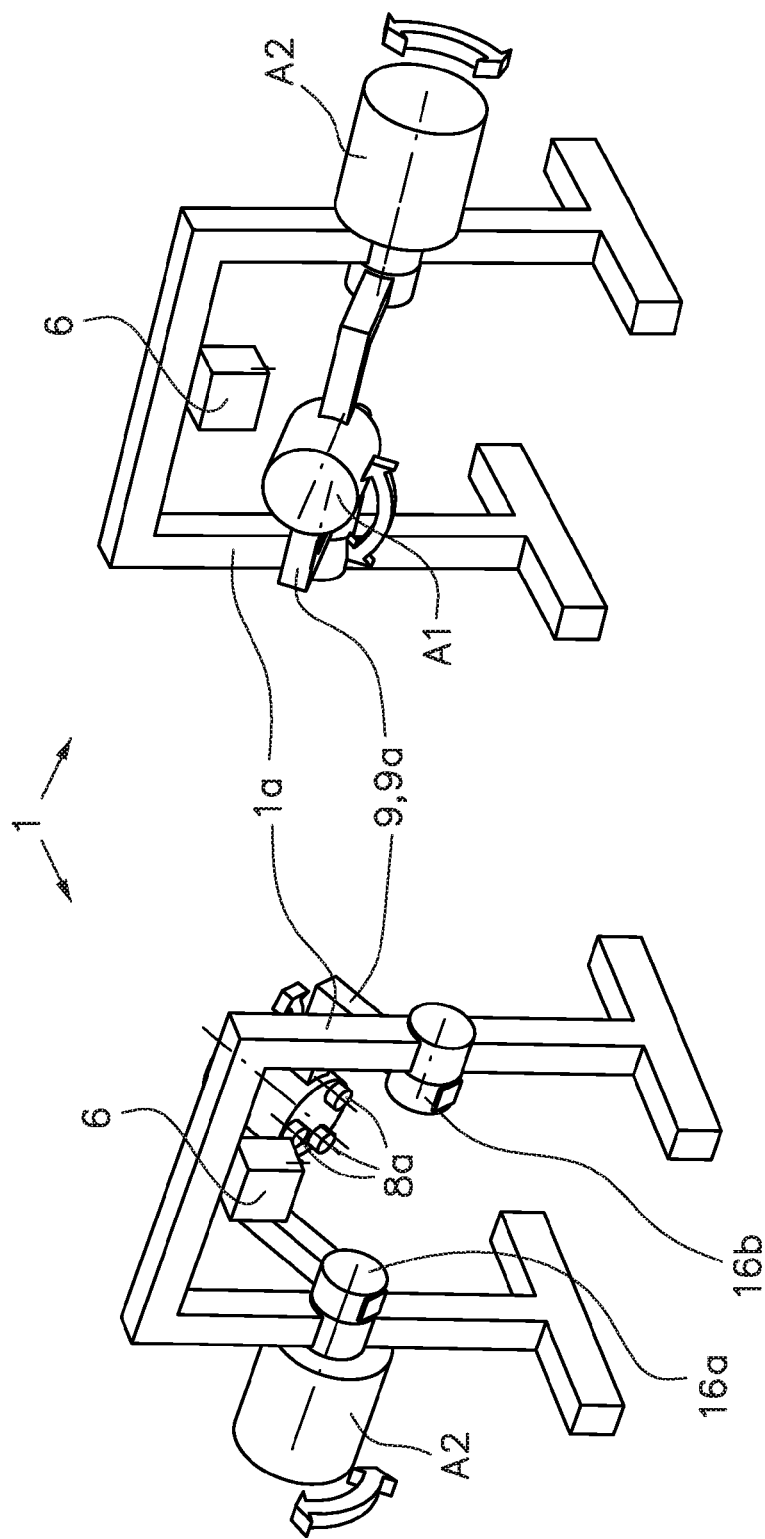
FIG. 2 includes two perspective views of a second preferred exemplary embodiment of a machine according to the invention.

FIG. 2 shows a perspective illustration of a further preferred exemplary embodiment of a machine according to the invention in two views. In the machine 1, the rocker 9a is received in two pivot bearings 16a and 16b on the frame 1a. During printing, the ball 2 is moved past the inkjet print head 6 by the second drive A2. After a first print run is printed on the surface of the ball 2 in this way, the ball 2 is rotated further approximately by the width of a print run by the first drive A1. The printing of a second print run which adjoins the first print run then takes place by way of rotation by using the second drive A2, and so on.

FIG. 2 shows only the inkjet print head 6 as a unit in the tool plane 1b.

FIG. 3 shows a perspective illustration of a further preferred exemplary embodiment of a machine according to the invention in two views. Three load-bearing spheres 12a, 12b and 12c are received freely rotatably in the frame 1a of the machine 1. The ball 2 is supported by the spheres. The load-bearing spheres can be configured as known spherical rollers. A fan 8b is disposed below the spheres. The fan 8b sucks in air through an annular gap 17 between the ball 2 and the frame 1a. As a result, the ball 2 is pulled downward onto the load-bearing spheres and is in frictional contact with the latter. The two drives A1 and A2 act on a load-bearing sphere through respective friction wheels 13a and 13b. As a result, a rotation of the drives leads to a rotation of the load-bearing spheres 12a, 12b and 12c and finally through friction to a rotation of the ball 2. The ball 2 can be rotated freely under the inkjet print head 6 in this way and can therefore be printed at any desired location.

In order to print balls having different diameters, provision may be made for the suckers 8a to be constructed in such a way that they are adjustable or for the suckers to be exchanged. The annular gap 17 can likewise be constructed to be variable in order to adapt it to balls of different sizes.

Furthermore, the machine can include:
a unit for storing balls,
a unit for feeding the balls to the printing apparatus 6,
a unit for counting the balls,
a unit for inflating the balls to a predefined pressure before being fed to the printing apparatus 6,
a unit for checking the balls and excluding faulty balls,
a unit for orienting the balls in the machine 1,
a printing apparatus 6 having exchangeable print heads,
an ink supply for the print heads 6,
a unit for checking the print and for excluding faultily printed balls,
a unit for transferring the finished balls to a packaging machine, and
a housing for protecting the balls and the operator.

The invention claimed is:

1. A machine for inkjet printing of three-dimensional objects, the machine comprising:
 a printing apparatus including an inkjet print head configured for inkjet printing an object;
 a holding apparatus including at least one sucker configured to hold the object; and
 a rotation apparatus including a rocker and including a first drive and a second drive configured to rotate the object about two mutually different rotational axes, said first drive driving said at least one sucker and said second drive driving said rocker.

2. The machine according to claim 1, wherein said rotational axes cross one another and are perpendicular to one another.

3. The machine according to claim 1, which further comprises a distance-changing apparatus for changing a distance between the object and said inkjet print head, said distance-changing apparatus including a third drive for changing said distance, and said rocker being disposed on said distance-changing apparatus.

4. The machine according to claim 3, wherein said distance-changing apparatus includes a fourth drive for rotating said distance-changing apparatus.

5. A machine for inkjet printing of three-dimensional objects, the machine comprising:
 a printing apparatus including an inkjet print head configured for inkjet printing an object;
 a holding apparatus including at least one sucker having a fan and being configured to hold the object; and
 a rotation apparatus including a first drive and a second drive configured to rotate the object about two mutually different rotational axes, said rotation apparatus including first, second and third load-bearing spheres;

said first drive and said second drive each being configured to drive a respective one of said first load-bearing sphere and said second load-bearing sphere, and said first and second drives each having a respective friction wheel.

6. A machine for inkjet printing of three-dimensional objects, the machine comprising:
- a printing apparatus including an inkjet print head configured for inkjet printing an object, a fifth drive for positioning said inkjet print head relative to the object and a sensor for measuring a distance between said inkjet print head and the object;
- a holding apparatus including at least one sucker configured to hold the object; and
- a rotation apparatus including a first drive and a second drive configured to rotate the object about two mutually different rotational axes.

7. A machine for inkjet printing of a three-dimensional object being a ball having a gas-filled cover, the machine comprising:
- a printing apparatus including an inkjet print head configured for inkjet printing on the object;
- a holding apparatus including at least one sucker configured to hold the object;
- a rotation apparatus including a first drive and a second drive configured to rotate the object about two mutually different rotational axes; and
- a unit filling the object with gas.

8. The machine according to claim 7, wherein said unit for filling the ball with gas includes a regulating device regulating filling of the ball with gas or emptying of the ball until a distance between the ball and the inkjet print head corresponds to a predefined value.

9. A machine for inkjet printing of three-dimensional objects, the machine comprising:
- a printing apparatus including an inkjet print head configured for inkjet printing an object;
- a holding apparatus including at least two or three suckers disposed adjacent one another on said holding apparatus and configured to hold the object; and
- a rotation apparatus including a first drive and a second drive configured to rotate the object about two mutually different rotational axes.

* * * * *